United States Patent
McQueen, III et al.

(10) Patent No.: US 7,765,130 B2
(45) Date of Patent: Jul. 27, 2010

(54) PERSONALIZATION USING MULTIPLE PERSONALIZED SELECTION ALGORITHMS

(75) Inventors: Clyde D. McQueen, III, Seattle, WA (US); Michael Irvin Hyman, Seattle, WA (US); Richard Scott Brinkerhoff, Burien, WA (US)

(73) Assignee: Amazon.com, Inc., Seattle, WA (US)

( * ) Notice: Subject to any disclaimer, the term of this patent is extended or adjusted under 35 U.S.C. 154(b) by 290 days.

(21) Appl. No.: 11/957,194

(22) Filed: Dec. 14, 2007

(65) Prior Publication Data

US 2008/0133298 A1   Jun. 5, 2008

Related U.S. Application Data

(63) Continuation of application No. 10/640,512, filed on Aug. 13, 2003, now Pat. No. 7,310,612.

(51) Int. Cl.
*G06Q 30/00* (2006.01)
(52) U.S. Cl. .................................... 705/26
(58) Field of Classification Search .............. 705/26, 705/27
See application file for complete search history.

(56) References Cited

U.S. PATENT DOCUMENTS

| | | | |
|---|---|---|---|
| 6,092,049 | A | 7/2000 | Chislenko et al. |
| 6,598,026 | B1 | 7/2003 | Ojha et al. |
| 6,604,681 | B1 | 8/2003 | Burke et al. |
| 6,606,744 | B1 | 8/2003 | Mikurak |
| 6,947,922 | B1 | 9/2005 | Glance |
| 6,950,804 | B2 | 9/2005 | Strietzel |
| 7,069,234 | B1 | 6/2006 | Cornelius et al. |
| 7,072,888 | B1 | 7/2006 | Perkins |
| 7,076,443 | B1 | 7/2006 | Emens et al. |
| 7,113,917 | B2 | 9/2006 | Jacobi et al. |
| 2001/0014868 | A1 | 8/2001 | Herz et al. |
| 2001/0021914 | A1 | 9/2001 | Jacobi et al. |
| 2002/0010625 | A1 | 1/2002 | Smith et al. |
| 2002/0019763 | A1 | 2/2002 | Linden et al. |
| 2002/0022999 | A1 | 2/2002 | Shuster et al. |

(Continued)

FOREIGN PATENT DOCUMENTS

WO    WO 01/15002 A2    3/2001

OTHER PUBLICATIONS http://proquest.umi.com/pqdweb?index=0&did=55335483&SrchMode=1&sid=1&Fmt=3&VInst=PROD&VType=PQD&RQT=309&VName=PQD&TS=1273698995&clientId=19649; Chris Clayton, Omaha World—Herald. Omaha, Neb.: Jun. 19, 2000. p. 11.*

(Continued)

*Primary Examiner*—Mila Airapetian
(74) *Attorney, Agent, or Firm*—Knobbe, Martens, Olson & Bear LLP

(57) ABSTRACT

Various computer-implemented methods are disclosed for selecting items, including but not limited to user-submitted blurbs, to present to users. One such method comprises using a plurality of personalized selection algorithms to select items to nominate for presentation to a target user. Each personalized selection algorithm outputs one or more item nominations for the target user together with an associated relevance score for each nominated item. The method further comprises receiving the item nominations and associated relevance scores from the personalized selection algorithms, normalizing the relevance scores, and using at least the normalized relevance scores to select particular items to present to the target user.

39 Claims, 8 Drawing Sheets

U.S. PATENT DOCUMENTS

| | | | |
|---|---|---|---|
| 2002/0103692 | A1 | 8/2002 | Rosenberg et al. |
| 2002/0107861 | A1 | 8/2002 | Clendinning et al. |
| 2002/0111904 | A1 | 8/2002 | Gruber et al. |
| 2002/0116291 | A1 | 8/2002 | Grasso et al. |
| 2002/0120564 | A1 | 8/2002 | Strietzel |
| 2002/0178057 | A1 | 11/2002 | Bertram et al. |
| 2002/0198882 | A1 | 12/2002 | Linden et al. |
| 2003/0065520 | A1 | 4/2003 | Jutzi et al. |
| 2003/0083961 | A1 | 5/2003 | Bezos et al. |
| 2003/0233422 | A1 | 12/2003 | Csaszar et al. |
| 2005/0033657 | A1* | 2/2005 | Herrington et al. ............ 705/26 |
| 2005/0125307 | A1 | 6/2005 | Hunt et al. |
| 2005/0171855 | A1 | 8/2005 | Westphal |
| 2005/0171861 | A1* | 8/2005 | Bezos et al. .................. 705/26 |
| 2006/0195362 | A1 | 8/2006 | Jacobi et al. |
| 2006/0253542 | A1 | 11/2006 | McCausland et al. |

OTHER PUBLICATIONS

Riggs, T., and Wilensky, R., "*An Algorithm for Automated Rating of Reviewers*," International Conference on Digital Libraries, Proceedings of the First ACM/IEEE-CS Joint Conference on Digital Libraries, pp. 381-387 (2001).

Four web pages printed from www.newsmonster.org site on Aug. 8, 2003; namely web pages at www.newsmonster.org/profile.html (3 printed pages), www.newsmonster.org/reputation.html (1 printed page); www.newsmonster.org/intro-SortbyReputation.html (1 printed page), and www.newsmonster.org/feature-breakdown.html (2 printed pages).

Searls, D., and Sifry, D., "*Building with Blogs*," Linux Journal, vol. 2003, Issue 107, p. 4, dated Mar. 2003.

Roscheisen, M., Mogensen, C., and Winograd, T., "*Beyond Browsing: Shared Comments, SOAPS, Trails, and On-Line Communities*," Proceedings of the Third International World-Weide Web Conference, Computer Networks and ISDN Systems 27, pp. 739-749, dated Apr. 10-14, 1995.

Resnick, P., Iacovou, N., Suchak, M., Bergstrom, P., and Riedl, J., "*GroupLens: An Open Architecture for Collaborative Filtering of Netnews*," Proceedings of ACM 1994 Conference on Computer Supported Cooperative Work, pp. 175-186 (1994).

Prior art description at paragraphs 3-5 of present application.

English translation of office action dated Aug. 27, 2008 in counterpart Japanese Patent Application No. 2006-523334.

English abstract of Japanese Patent Publication JP2003085433, published Mar. 20, 2003.

English abstract of Japanese Patent Publication JP2003216636, published Jul. 31, 2003.

English abstract of Japanese Patent Publication JP2004015690, published Jan. 22, 2004.

English abstract of Japanese Patent Publication JP2002123633, published Apr. 26, 2002.

English abstract of Japanese Patent Publication JP2002215665, published Aug. 2, 2002.

"Amazon Maps Path to Web Success for Other Retailers Technology of Site Leads to Spinoff Firm," Helen Jung The Associated Press, South Florida Sun—Sentinel, Fort Lauderdale, Florida, Jun. 29, 2003, p. 3.G.

Schafer et al., "E-Commerce Recommendation Applications," Data Mining and Knowledge Discovery, vol. 5, Nos. 1-2, Jan. 2001, pp. 115-153.

* cited by examiner

FIG. 4

Hello, John Smith. (If you are not John Smith, click here.)

Your Plog
a personalized web log

VIEW CART | WISH LIST | YOUR ACCOUNT | YOUR PLOG | HELP

SEARCH
Entire Catalog [GO]

BROWSE
- Apparel & Accessories
- Office Products
- Books
- DVD
- Magazine Subscriptions
- Music
- Video 10:11am   3/12/03
An internal blurb by Jane Doe

BOOK COVER ART

What is nanotechnology?
Nanotechnology is the quest to build machinery of extremely small size as seen in the book Prey, on the order of 100 nanometers, or a hundred billionth of a meter. Such machines would be about 1,000 times smaller than the the diameter of a human hair. Pundits predict these tiny machines will provide everything from miniaturized components to new cancer treatments to new weapons of war.

Relevancy Rating: 90% Why?
Viewed by 34,000 people
Rate It 😞 😐 😊   Discuss | Write a blurb | ▶ More options

62

10:15am   3/12/03
An external blurb from Elizabeth, a Coffee Connoisseur

The Best Cafes in San Francisco.

PERSONALIZATION USING MULTIPLE PERSONALIZED SELECTION ALGORITHMS

RELATED APPLICATIONS

This application is a continuation of U.S. application Ser. No. 10/640,512, filed Aug. 13, 2003 now U.S. Pat. No. 7,310,612, the disclosure of which is hereby incorporated by reference.

BACKGROUND OF THE INVENTION

1. Field of the Invention

The present invention relates to personalization algorithms for providing personalized content to users.

2. Description of the Related Art

Web sites and other types of interactive systems commonly host electronic catalogs for assisting users in locating and evaluating various types of items. The items may, for example, include physical products, journal articles, movie and music titles, downloadable software, services, stock assets, businesses, and/or any other type of item that may be represented in a database. Electronic catalog systems also commonly support the ability for users to conduct various types of item-related transactions, such as purchasing an item, downloading an item, or selling an item.

To enhance the browsing experiences of users, electronic catalog systems commonly implement various types of features for assisting users in efficiently locating and evaluating catalog items. For example, some systems implement recommendation algorithms for recommending specific catalog items to users. The items are commonly recommended based on the purchase histories, browsing histories, and other types of user profile data reflective of users' interests.

Some systems also allow users to post reviews on specific catalog items. The reviews submitted for a particular item are typically displayed on a detail page for that item. In some cases, the associated user interface provides an option for users to vote on whether a particular review is helpful. A current tally of the votes submitted on a particular review is typically displayed to assist readers in assessing the review. The vote tallies may also be used to inhibit the display of poor quality reviews. In addition, the votes are used in some systems to generate and display ratings of specific reviewers, such that the readers of a given review can take into consideration the reputation of the associated reviewer.

Despite the existence of these and other features, electronic catalogs commonly lack the types of compelling content needed to attract and maintain the interests of users. One reason for this deficiency is that the operators of such systems typically lack the resources needed to generate such content. The present invention seeks to address this deficiency.

SUMMARY

Various computer-implemented methods are disclosed for selecting items, including but not limited to user-submitted blurbs, to present to users. One such method comprises using a plurality of personalized selection algorithms to select items to nominate for presentation to a target user. Each personalized selection algorithm outputs one or more item nominations for the target user together with an associated relevance score for each nominated item. The method further comprises receiving the item nominations and associated relevance scores from the personalized selection algorithms, normalizing the relevance scores, and using at least the normalized relevance scores to select particular items to present to the target user.

Neither this summary nor the following detailed description is intended to define the invention. The invention is defined by the claims.

BRIEF DESCRIPTION OF THE DRAWINGS

FIG. 4 illustrates a personal web log or "plog" page according to one embodiment of the invention.

DETAILED DESCRIPTION OF THE PREFERRED EMBODIMENTS

I. Overview

Figure 1:
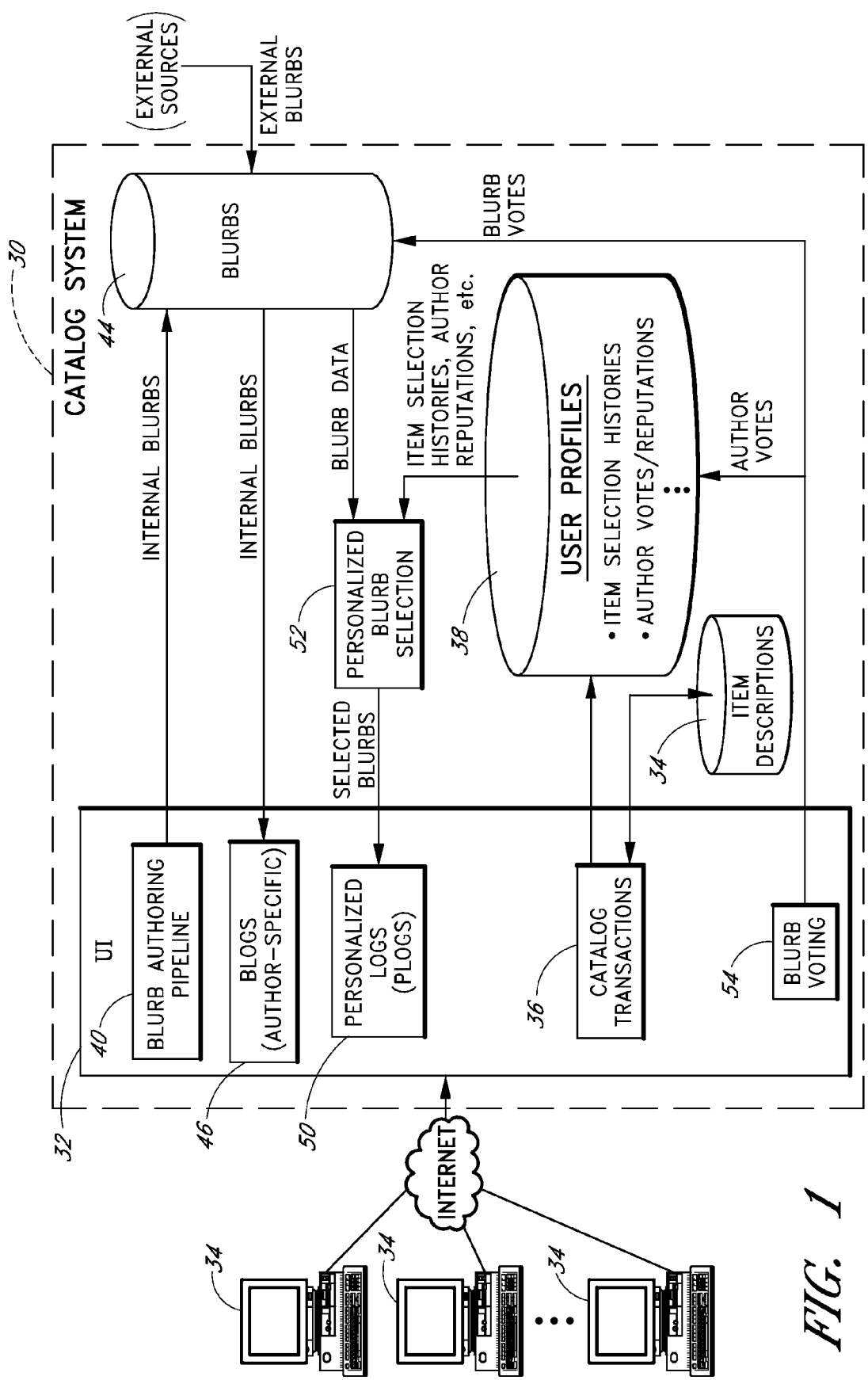
FIG. 1 illustrates an electronic catalog system according to one embodiment of the invention.

FIG. 1 illustrates an electronic catalog system 30 according to a preferred embodiment of the invention. The system 30 includes a user interface (UI) 32 that is accessible to Internet users via user computers 34 and/or other types of devices (PDAs, mobile telephones, etc.). The user interface 32 is preferably implemented as a collection of web pages, but may more generally be implemented using any platform that supports interactive browsing (e.g., online services networks, voice-based browsing systems, interactive television systems, etc.).

The user interface 32 preferably provides functionality for users to browse an electronic catalog of items, and to perform transactions with respect to such items. The items may, for example, be physical products (new and/or used), newspaper or journal articles, music files, software downloads, stocks and bonds, online auctions, and/or any other type of item commonly represented within an electronic catalog. The catalog may be that of a single business entity or a collection of business entities. Descriptions of the items represented in the electronic catalog are maintained in an item descriptions database 34. Each catalog item represented within the database 34 typically has unique item ID.

In one embodiment, users can obtain detailed information about, and initiate purchases of, specific items by browsing to corresponding item detail pages. The catalog may also include a browse tree, a search engine, and/or other tools for assisting users in locating specific catalog items. The types of transactions supported by the system may vary by item type, but may include, for example, purchases, sales to others, downloads, bids, and/or submissions of item reviews or ratings. For instance, the user interface 32 may support the ability for users to search for and purchase physical or downloadable products from a catalog of products. The user interface also includes functionality for users to set up and manage personal accounts. The user interface features for navigating the electronic catalog, performing transactions, and setting up/managing user accounts, are generally represented in FIG. 1 by the component 36 labeled "catalog transactions."

The catalog transactions component 36 accesses and updates a user profiles database 38 in response to actions performed by online users. This database 38 preferably maintains user-specific profiles that reflect user affinities for specific items and/or item categories. For example, the database 38 may maintain for each user an "item selection history" specifying all catalog items the respective user has purchased, reviewed, rated, viewed via an item detail page, downloaded, added to a personal wish list or shopping cart, and/or for which the user has performed some other type of item-affinity-evidencing action. The types of affinity-evidencing actions for which user-specific histories are maintained will generally vary depending upon the nature and purpose of the system 30 (e.g., user opinions, retail sales, user-to-user sales, online access to media content, music downloads, etc.). The user profiles may also include information about, for example, the item categories selected by each user for browsing, the search queries submitted by each user, and/or community memberships. More generally, the user profiles database 38 may store any information reflective of users' preferences for specific items and/or item categories (generally referred to herein as "user preference data").

As further illustrated in FIG. 1, the user interface 32 preferably also includes a blurb authoring pipeline 40 through which users can author and submit pieces of content called "blurbs." The blurbs are typically in the form of text, although images and other types of content may also be supported. The blurb authoring pipeline 40 may include one or more tools for assisting blurb authors in adding references to specific items or item categories of the catalog. For example, a link generation tool may be provided for creating and inserting links to specific item detail pages and browse node pages. A tool may also be provided for looking up the unique IDs of specific items. The blurb authoring pipeline 40 may require users to log in before posting a blurb, such that the blurbs can be reliably attributed to their respective authors.

Blurbs posted via the blurb authoring pipeline 40 are stored in a blurbs database 44. As discussed below, blurbs are selected from this database 44 to present to specific users according to one or more personalized blurb selection algorithms. As depicted by the "blogs" user interface component 46 in FIG. 1, users of the system 30 can also preferably view the blurbs created via the authoring pipeline 40 in an author-specific blog format. For example, users may visit a page associated with a particular author to view a chronological log of the blurbs submitted by that author, or equivalently, to view that author's blog. Each blurb created using the blurb authoring pipeline 40 thus preferably becomes an entry within the corresponding author's publicly-accessible blog. Author-specific blogs may alternatively be omitted (i.e., blurbs created via the blurb authoring pipeline 40 need not be displayed as blog entries).

If author-specific blogs are provided, each such blog may be published using RSS ("RDF Site Summary" or "Rich Site Summary")—an XML format for syndicating web content—so that blog aggregators and other types of web sites can re-publish the content contained in such blogs. The use of RSS to share and license web content across web sites is well known in the art. User's may also be given the option to control whether their respective blogs are to be made available via RSS.

As depicted in FIG. 1, the blurbs database 44 may also be populated with blurbs obtained from one or more external sources. For example, in the preferred embodiment, blurbs are periodically uploaded to the database 44 via RSS feeds from various external web sites that host blogs, newsletters, and/or other forms of user-created content. An RSS feed is generally an RSS-format web page that is used as a recurring source of content. Each such RSS page may be preferably retrieved periodically, such as several times a day, to check for new items (blog entries, news articles, etc.). Some or all of the new items located through this process are added to the blurbs database 44 as blurbs. New RSS feeds are preferably discovered using a spider program that starts with a known list of RSS feeds (e.g., from a known RSS feed aggregator), retrieves RSS pages from such feeds, and scans these pages for references to other feeds. The user interface 32 may also include a form for enabling users to specify the locations of RSS feeds.

Blurbs created via the blurb authoring pipeline 40 are referred to herein as "internal blurbs," and blurbs obtained from other sources are referred to as "external blurbs." An external blurb may be represented within the blurbs database 44 without actually copying over the entire blurb to the database 44. Although both internal and external blurbs are used in the preferred embodiment, as will be recognized, the invention may be practiced using only one type of blurb (internal or external) and not the other. Further, the system may 30 include an API (application program interface) through which users of the system 30 can edit their blogs, and/or add new blog entries (blurbs), using web services. A web service is typically in the form of machine-readable SOAP (Simple Object Access Protocol) message.

According to one aspect of the invention, blurbs are also selected from the database 44 to present to specific users based the preference data of such users. The task of selecting the blurbs is performed by a "personalized blurb selection" component 52, which implements one or more blurb selection algorithms as described below. The personalized blurb selection component 52 selects blurbs to present to a given user based at least in part on one or more of the aforementioned types of user preference data. For example, a set of blurbs may be selected to present based on the target user's item selection history or a selected portion of that history. More generally, blurbs may be selected based in-whole or in-part on any information reflective of the user's preferences for specific items and/or item categories.

As discussed in further detail below, the blurbs are preferably selected using a set of personalized blurb selection algorithms that take into account the item selection histories of users. One such algorithm selects blurbs from authors having item selection histories similar to the item selection history of the target user. Another personalized blurb selection algorithm evaluates each blurb as a selection candidate by evaluating the extent to which those with similar item selection histories to that of the target user responded favorably to the blurb. Yet another personalized blurb selection algorithm selects blurbs that reference catalog items that (a) have been selected by the target user, and/or (2) are similar to items selected by the target user.

The blurbs selected to present to a target user are preferably presented in the form of a personalized log or "plog." As with blogs, plogs are preferably in the form of chronological sequences of blurbs. Unlike a blog, a plog will typically contain entries (blurbs) from many different authors, and will be specific to a particular target user (i.e., plogs generally are not publicly accessible). A selected number of new blurbs (e.g., ten or twenty) may be added to each user's plog periodically, such as once per day. In one embodiment, each user of the system 30 can access a plog page to view his or her plog (see FIG. 4, discussed below). A condensed representation of the plog may also be displayed on a home or gateway page of the catalog system (see FIG. 5), and possibly on other types of pages associated with the catalog.

Where external blurbs are included within the plogs, the amount of blurb text displayed may be selected based on the type of license involved. For example, blurbs obtained from external blogs with "by attribution" licenses may be displayed in full. For other types of blog licenses such as "non-commercial" or "no derivative works," a selected excerpt of each external blurb may be displayed (e.g., the title plus the first twenty words), together with a link to the originating site.

In addition to providing plogs (personalized logs of selected blurbs), blurbs may be selected to present to users based on the contexts of the users' browsing sessions. For example, one or more blurbs may be selected based on the item or item category currently being viewed by the user, based on the item or item categories viewed during the current browsing session, and/or based on the contents of the user's shopping cart. These context-dependent blurbs may be presented on any appropriate page, such as an item detail page or a browse node page of the electronic catalog.

As depicted by the "blurb voting" component 54 in FIG. 1, users are preferably given the option to rate some or all of the blurbs they review by casting votes. The votes may be cast according to a specified rating scale (e.g., "poor," "average," and "good"), and may be based on quality, relevance, or any other appropriate criteria. The option to vote on a blurb may be presented whenever that blurb is displayed, or may be presented only when the blurb is displayed as the result of a selection algorithm. Each vote is preferably recorded in the blurbs database 44, and preferably affects the frequency with which the corresponding blurb is subsequently selected to present to other users. Although the votes are preferably blurb-specific, the system may additionally or alternatively allow users to vote on an entire blog that contains many blurbs from the same author. Further, as discussed below, implicit forms of voting may be used.

As depicted by the arrow labeled "author votes" in FIG. 1, a vote on an internal blurb (or blog) also preferably serves as a vote on the corresponding author, and is thus recorded by the blurb voting component 54 in association with the author's user ID. Authors of blurbs can thus develop "reputations" over time, which may in turn be taken into consideration by the personalized blurb selection component 52. For example, when an author creates a new blurb, the author's reputation may be used to select an initial injection rate for injecting the blurb into the plogs of users; thereafter, the injection rate may be adjusted based on feedback (votes) from readers of the blurb. An author's reputation may be represented as a reputation score or grade that is based on the following and/or other criteria, the number of blurbs written, the total number of votes cast on such blurbs, and the average rating of such votes. Author vote and reputation data is preferably maintained for all authors of internal blurbs, and may also be maintained for authors of external blurbs.

A vote cast in response to the personalized selection and display of a blurb may be treated as a vote on the quality of the particular selection algorithm used to select the blurb. For example, if several different competing selection algorithms are used (as discussed below), the associated blurb votes may be used over time to evaluate the relative accuracy of each such algorithm. Selection algorithms that perform poorly relative to the others may be dropped or modified, or may be accorded a lesser weight in selecting blurbs to present. Further, if a given user has consistently responded favorably to blurbs nominated by a particular selection algorithm, that selection algorithm may be treated as being more reliable for that particular user.

In addition to the blurb selection and display methods mentioned above, the system 30 may provide various other navigation features for assisting users in locating blurbs and blogs. For example, the system may also use the aforementioned votes to generate and display a publicly accessible page that lists or contains the blurbs that are currently the most popular among the entire user population, or that are currently gaining in popularity the fastest.

The internal and external blurbs are preferably represented within the blurbs database 44 together with various elements of associated data. The data stored for a given blurb may include, for example, a unique blurb ID, the ID of the author, the date of creation, the author's reputation as of the blurb's creation date, the number of votes within each rating category, the contexts of such votes (e.g., whether in response to a personalized blurb selection algorithm versus some other blurb surfacing method), IDs of any items referenced by the blurb, whether the blurb is internal versus external, etc. These and other data elements may be used by the personalized blurb selection component 52. A background process (not shown) may automatically prune the database 44 of blurbs that are outdated or have unfavorable vote tallies.

A given blurb may also be stored in the database together with one or more author-specified "hints" that identify classes of target readers. For example, the author of a blurb may specify that the blurb should be displayed to users who have purchased a particular item, to users who reside in a particular region, or to users who belong to a particular community. Any hints provided by the authors may be taken into consideration by the personalized selection algorithms.

The system depicted in FIG. 1 thus provides users with fresh, personalized content (blurbs) from numerous authors during visits to the electronic catalog, increasing the likelihood of frequent return visits by such users. In many cases, the selected blurbs also include information that assists users in making informed item selection decisions. For example, a given blurb may reference one or more items that are of interest to the target user, and may indicate the author's opinion about such items. The system also preferably enables users to maintain their own publicly accessible blogs.

Figure 8:
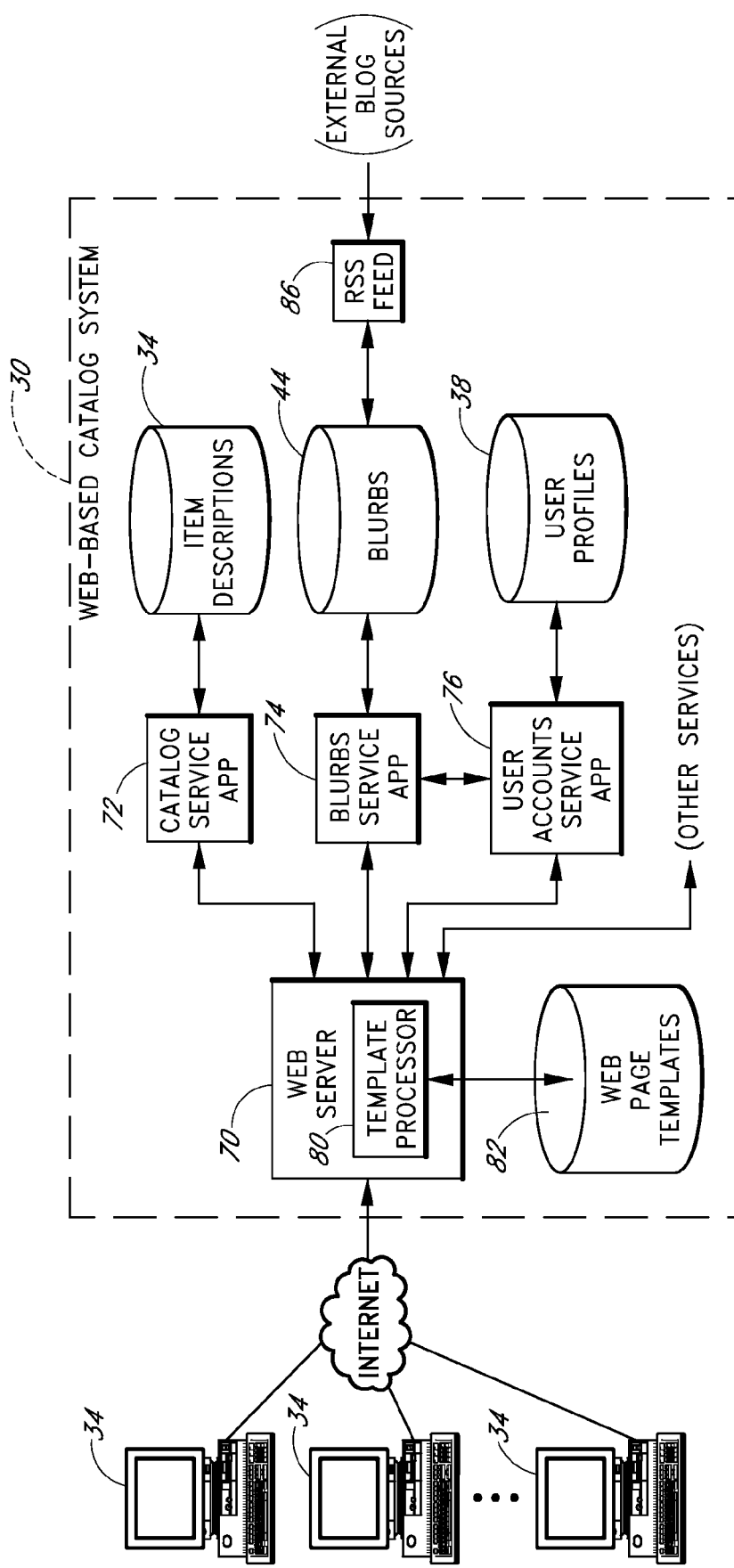
FIG. 8 illustrates a set of web site components that may be used to implement the system of FIG. 1.

The foregoing functions may be implemented within executable software that runs on one or more general purpose computers. The invention may be embodied within a web site, an online services network, or any other type of multi-user system that supports interactive browsing of catalog content. One example of a general web site architecture that may be used is shown in FIG. 8 and is discussed below.

II. Example Screen Displays

Figure 2:
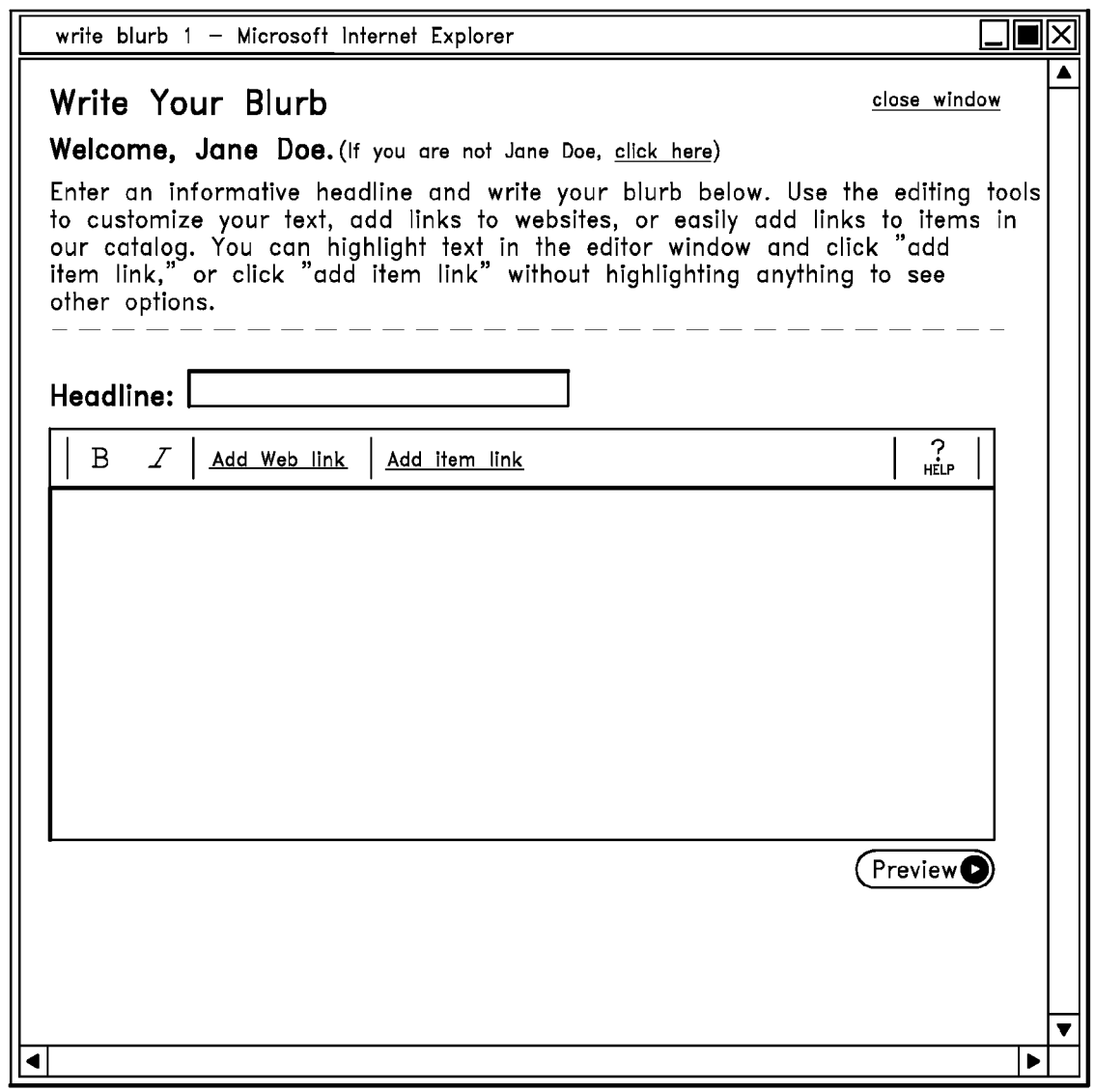
FIGS. 2 and 3 illustrate example screen displays of the blurb authoring pipeline of FIG. 1.
Figure 3:
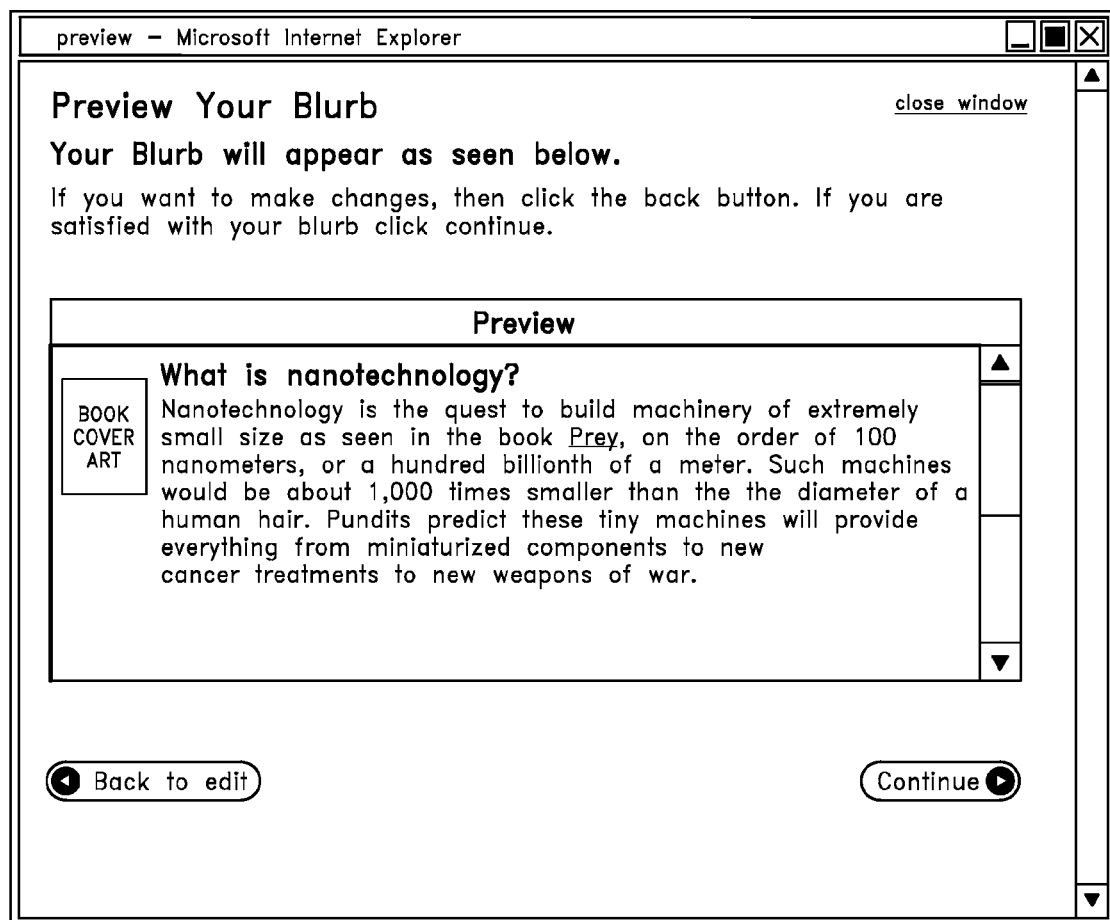

FIGS. 2 and 3 illustrate two example screens of the blurb authoring pipeline 40. The first screen (FIG. 2) provides instructions for creating a blurb, and includes an area for entering the headline and body of the blurb. In this example, blurb authors are encouraged to add links to specific items in the catalog, and are provided with a tool for doing so. The author can also insert links to other web sites.

Once the blurb text has been entered, the author selects the "preview" button to view a "preview your blurb" screen of the type shown in FIG. 3. In this example, the author has added a link to a particular catalog item, and more specifically, to a particular book title. A graphic associated with this book title has automatically been added to the display. Subsequent screens of the blurb authoring pipeline may allow the user to add one or more hints regarding the target audience for the blurb, as explained above. The author may also be required to log in before posting the blurb.

Once the blurb has been posted, it preferably appears on the author's publicly accessible blog page as an entry within a chronological log of entries. In addition, the blurb becomes available to the personalized blurb selection algorithms, and to any other selection algorithms used to select blurbs for display.

FIG. 4 illustrates a portion of an example plog page, with a single plog entry (blurb) 60 shown in its entirely. Each entry within the plog is a blurb that was selected for the target user (the plog's "owner") by the personalized blurb selection component 52. The plog is presented in reverse chronological order such that the most recent entries appear at the top of the page. The blurb 60 is displayed together with the following information: the date and time of creation, the name of the author (displayed as a link to the author's blog page), a graphic of the referenced item, an indication of the number of users who have viewed the blurb 60, and a relevancy rating reflective of a score generated by a personalized selection algorithm.

Also displayed is a set of icons 62 for voting on the blurb. In this example, three rating levels are supported: good, neutral, and poor. The voting interface may alternatively use a different number of rating levels. For example, a 2-level scale may be used in which users are asked whether they liked the blurb, or a 5-level scale may be used in which users are asked to rate the blurb on a scale of 1-5.

With further reference to FIG. 4, a "more options" drop down menu allows the plog's owner to access other options, such as an option to send the blurb to a friend, and an option to create a new blurb that references the displayed blurb 60. Certain types of user actions, such as sending the blurb to a friend, may optionally be treated as votes in favor of the blurb (i.e., implicit voting may be supported). The plog page also includes a search engine box and various links for searching and browsing the catalog.

Figure 5:
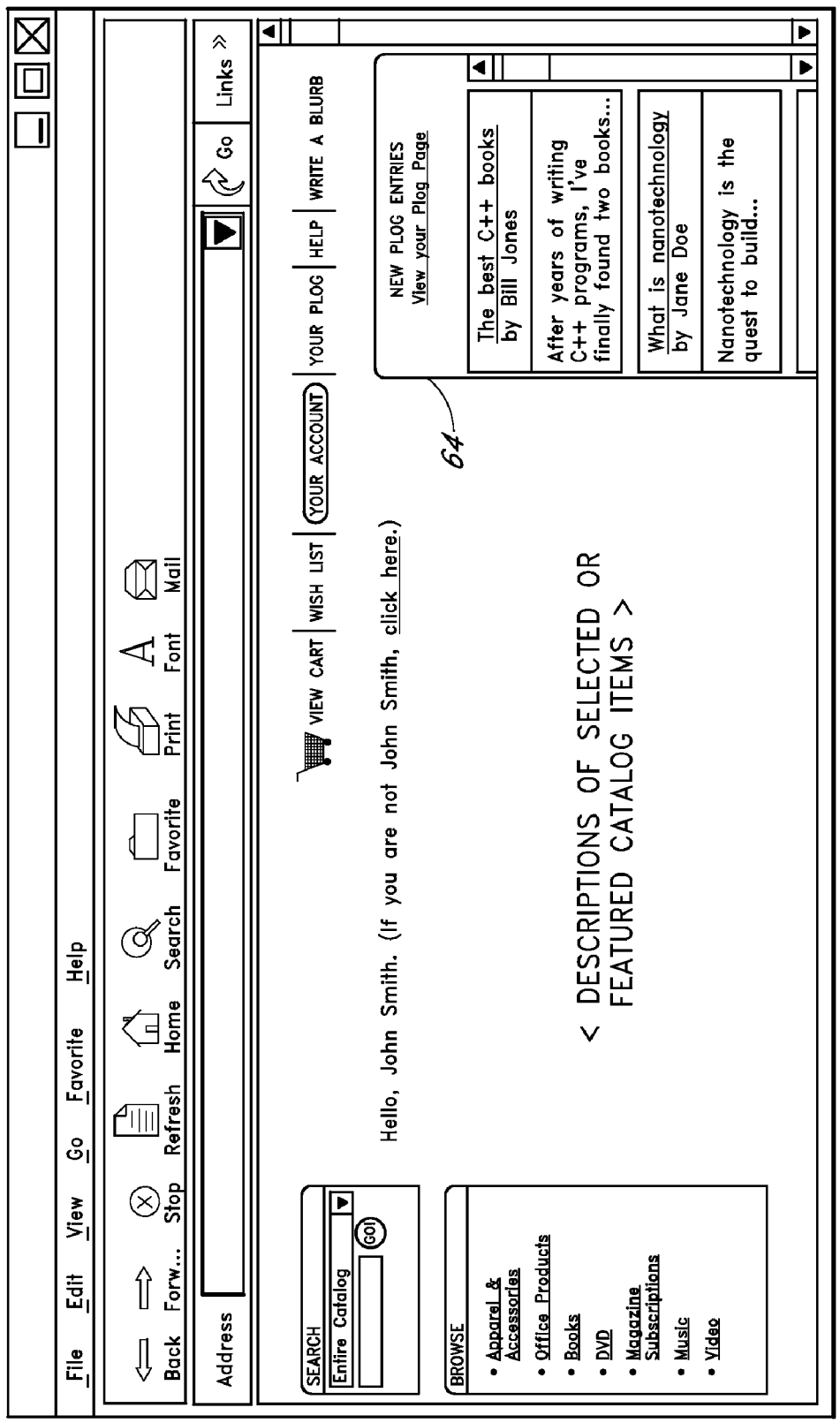
FIG. 5 depicts a personalized gateway page showing how new plog entries may be represented in a condensed form.

FIG. 5 illustrates an example home or "gateway" page as personalized for a particular user. The gateway page includes a "plogette" portion 64 that includes a condensed representation of the user's plog or of a most recent portion of the plog. The condensed representation preferably includes short excerpts of the plog entries most recently added to the user's plog (two shown), together with links to these entries. The gateway page may also be populated with descriptions of various items selected from the catalog.

As mentioned above, blurbs selected by the personalized blurb selection component 52 may also be presented on various other types of catalog pages, including browse node pages and item detail pages. In such instances, the context of the user's browsing session (e.g., the item or item category being viewed) may be taken into consideration in selecting blurbs to present.

III. Personalized Blurb Selection Algorithms

In the preferred embodiment, blurbs are selected to inject into specific plogs using a plurality of competing blurb selection algorithms, each of which uses different selection criteria. The use of multiple competing selection algorithms tends to provide greater diversity of entries within each plog. Although the use of multiple competing selection algorithms is preferred, the blurbs may alternatively be selected, e.g., using a single selection algorithm, or by rotating among a set of alternative selection algorithms.

Figure 6:
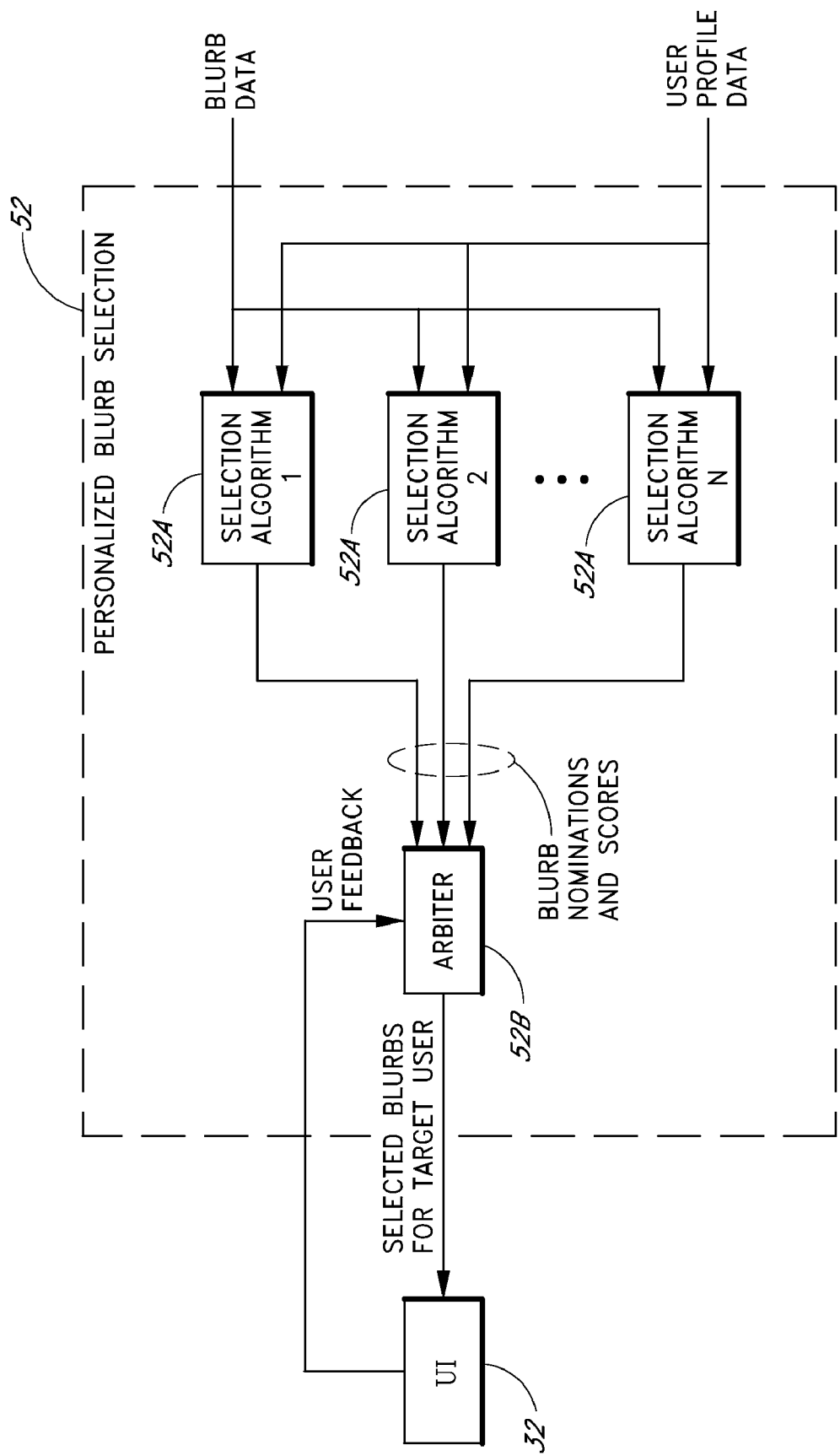
FIG. 6 illustrates a preferred embodiment of the personalized blurb selection component of FIG. 1.

FIG. 6 illustrates the general process by which newly created blurbs are selected to present to a specific user. Each of multiple blurb selection algorithms 52A uses its respective selection criteria to assign relevance scores to specific blurbs that have recently been added to the database 44. At least some of these algorithms take information about the target user into consideration in generating the relevance scores, although different selection algorithms may consider different elements or types of user preference data.

As illustrated, each selection algorithm 52A may nominate one or more blurbs to present to a given target user. An arbiter component 52B considers these nominations, including the associated relevance scores, and selects the blurbs that are ultimately to be added to the target user's plog or otherwise presented to the target user. As part of this process, the blog scores generated by the various selection algorithms 52A may be normalized and compared. The arbiter 52B may use a variety of different criteria to make the ultimate blurb selections. For example, to provide a degree of variation, the arbiter 52B may ensure that the target user sees blurbs nominated by each of the selection algorithms 52A, or may otherwise ensure that the target user's plog is not dominated by the nominations of any particular selection algorithm 52A. In addition, the arbiter 52B may give significantly greater weight to any blurb that was nominated by more than one selection algorithm 52A.

As depicted in FIG. 6, the arbiter 52B may also take into consideration the reader feedback that has been provided on each nominated blurb. In addition, the arbiter 52B may take into consideration the feedback provided by the particular user in connection with each selection algorithm 52A. For example, if the target user has consistently responded favorably to blurbs nominated by a particular selection algorithm 52A, the nominations of that selection algorithm may be selected more frequently for that particular target user.

Several examples of the types of blurb selection algorithms 52A that may be used are provided below.

Item-referencing blurbs by item selection history: This selection algorithm 52A nominates blurbs that reference catalog items that appear within the item selection history (e.g., purchase history or review submission history) of the target user. The algorithm may also nominate blurbs that reference items that are similar to items in the item selection history of the target user. To implement this algorithm, a global reverse index is periodically generated that maps referenced items, and items similar to such referenced items, to specific blurbs that refer to the referenced items. Each such mapping carries a strength, with direct-reference mappings carrying a greater weight than similar item mappings. To select or nominate blurbs for a target user, the reverse index is initially accessed to identify the item-to-blurb mappings that correspond to the user's selection history. If two or more of these mappings are to the same blurb, the weightings associated with these mappings are summed to generate a user-specific weight for that blurb. Finally, the blurbs with the highest weights are selected.

Reader/Writer Selection History Similarity: This selection algorithm 52A identifies internal blurb authors that have similar item selection histories to that of the target user, and nominates blurbs by such "similar authors." Conventional collaborative filtering algorithms may be used to identify the authors that are the most similar to the target user. In one embodiment, several hundred authors are selected based on selection history overlap and the age of each author's most recent blurb. The vote-based reputations of these authors are then considered in selecting specific blurbs to nominate. This algorithm is based on the assumption that blurb authors who selected catalog items similar to those selected by the target user are likely to author content that is interesting to the target user. A variation of this algorithm is to identify authors that have similar voting histories to that of the target user, and to nominate blurbs from these similar-voting authors.

Readers with similar selection histories liked it: This selection algorithm 52A selects blurbs that were liked by users having similar item selection histories to that of the target user, as reflected by explicit and/or implicit user feedback. This algorithm is preferably implemented using a mapping of specific blurbs to catalog items selected by readers of such blurbs, as depicted in Table 1. In one embodiment, each time a reader casts a positive or negative vote on a particular blurb, the associated mapping is updated to increase (if a positive vote) or decrease (if negative) the blurb-specific scores associated with each item in the reader's item selection history. For a given blurb, each item in the catalog can thus have a blurb-specific score that is positive, negative, or zero.

TABLE 1

|  | Item 1 | Item 2 | ... | Item N |
|---|---|---|---|---|
| Blurb 1: | 0 | 5 |  | −4 |
| Blurb 2: | 12 | −6 |  | 0 |
| . | . | . |  | . |
| . | . | . |  | . |
| . | . | . |  | . |
| Blurb N: | −2 | 5 |  | 0 |

To evaluate whether a candidate blurb should be nominated for a particular target user, the associated blurb-specific scores of those items appearing in the target user's selection history are summed to generate a blurb score. The blurb scores of all candidate blurbs are then considered in combination to select specific blurbs. Other criteria, such as the reputations of the authors of the candidate blurbs, may also be taken into consideration. This algorithm is based on the assumption that readers that have similar item selection histories will like similar blurbs.

This algorithm may also be used to personalize the selection of other types of content items, such as blogs, music files, product descriptions, or web sites. Further, rather than solely using explicit votes, the algorithm may additionally or alternatively use implicit votes on the blurb or other content item. For instance, when a user forwards a particular blurb to a friend or responds to the blurb by selecting the author's blog for viewing, the user may be deemed to have cast a favorable vote on the blurb. The algorithm may also be appropriately modified to rely solely on favorable votes, or possibly to rely solely on unfavorable votes.

Figure 7:
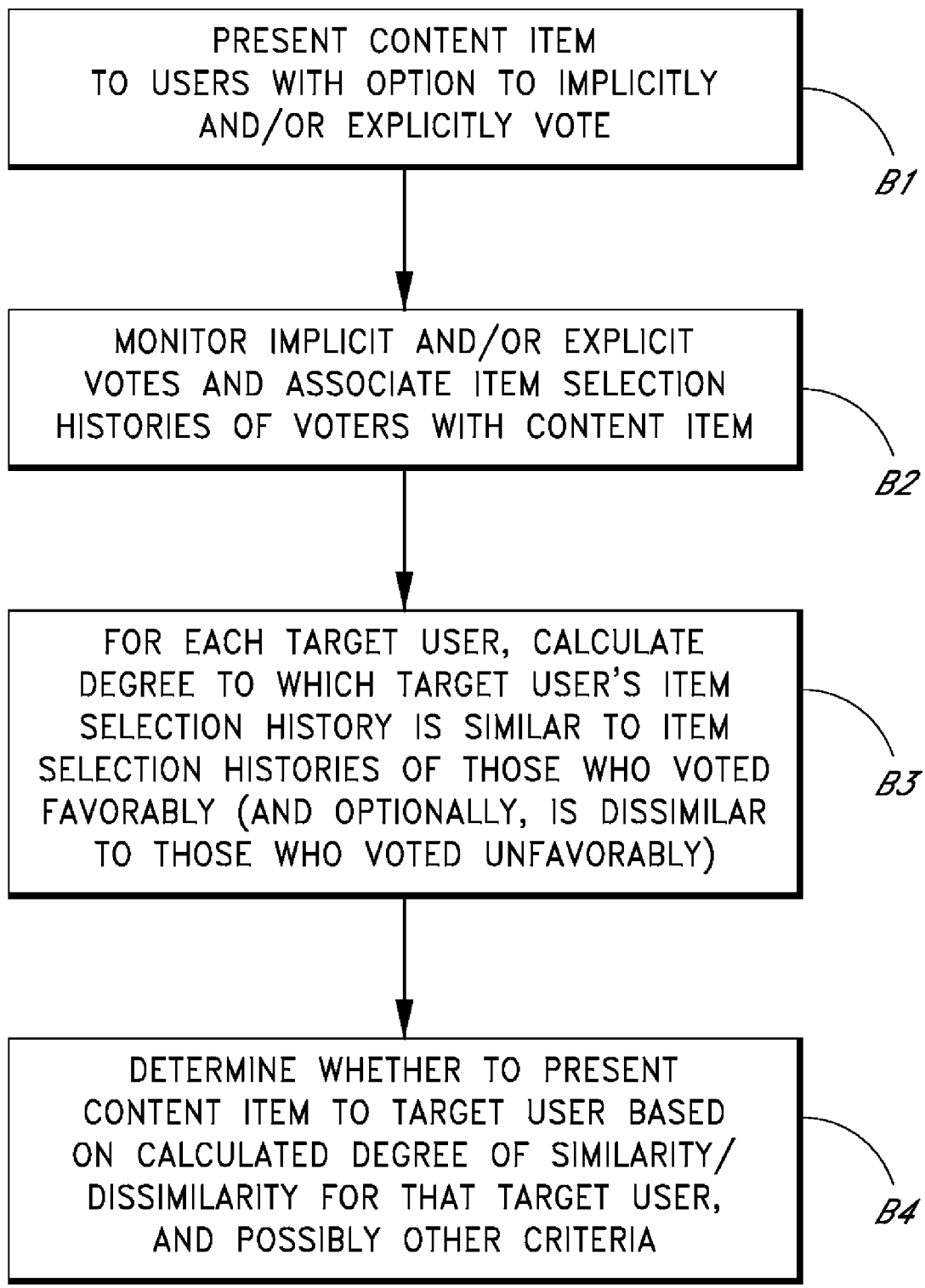
FIG. 7 illustrates the process flow associated with one method that may be used to personalize the selection of blurbs, and/or other types of content items, for specific users.

FIG. 7 illustrates the general process flow associated with this selection algorithm, as applied to a particular content item such as a blurb. As depicted in block B1, the content item is presented to users over time together with an option to explicitly and/or implicitly vote on the content item. As mentioned above, this option may, in some embodiments, consist of an option to implicitly or explicitly vote favorably, without any option to vote unfavorably. As depicted by block B2, the item selection histories of some or all of the voters are associated with the content item, such as by generating a mapping of the type shown in Table 1. The mapping may be updated as votes are cast, or may be generated periodically using previously-recorded votes. As depicted by block B3, to evaluate whether the content item should be presented to a particular target user, the degree of similarity between the target user's item selection history and the item selection histories of those who voted favorably on the content item is calculated. In embodiments in which unfavorable votes are recorded, the degree to which the target user's item selection history differs from those who voted unfavorably on the content item may also be considered, as is the case in the embodiment depicted by Table 1. Finally, as depicted by block B4, the calculated degree of similarity (and optionally dissimilarity) is used as at least one factor in deciding whether the content item should be presented to the target user.

Content-based: This blurb selection algorithm analyzes blurb content to search for blurbs that are related to the item and/or category preferences of the target user. Author reputations may also be taken into consideration.

Weighted random: This selection algorithm weights blurbs based on freshness and/or author reputation, then selects specific blurbs to nominate using a weighted random selection algorithm.

For the above and other blurb selection algorithms that rely on the item selection histories of users, different types of item selection histories may be used to achieve different results. For example, to identify blurbs that correspond closely to the target user's current browsing session, an item selection history consisting only of those items viewed during the current session may be used. In addition, although the system 30 may keep track of many different types of item selection actions (detail page views, purchases, review submissions, etc.), the blurbs may be selected using item selection histories that reflect only a subset of these monitored actions (e.g., purchases only).

In addition, rather than scoring and evaluating individual blurbs as described above, the system 30 may seek to identify entire blogs that are of interest to the target user. Once the most relevant blogs have been identified for a target user, the most recent entries within such blogs may be selected to present to the user. Selection algorithms similar to those described above may be used to select the most relevant blogs.

IV. Example Web Site Architecture

FIG. 8 illustrates one example of a web site architecture that may be used to implement the system 30 of FIG. 1. In this embodiment, the system includes a web server component 70 that communicates with various service applications, including a catalog service application 72, a blurbs service application 74 and a user accounts service application 76. Numerous other service applications may be provided for handling such tasks as authenticating users, processing orders, generating personalized item recommendations, etc. An RSS feed component 86 is also provided in this example for populating the blurbs database 44 with blurbs obtained from external sources, such as other web sites. The RSS feed component 86 preferably performs the aforementioned tasks of locating new RSS pages, periodically checking known RSS pages for new entries, and adding new entries to the database 44 as external blurbs.

The web server 70 includes or communicates with a template processor 80 that accesses a database 82 of web page templates. These templates specify the basic layout of the author pipeline pages (FIGS. 2 and 3), plog pages (FIG. 4), gateway pages (FIG. 5), item detail pages, and various other web pages of the web site. The templates also specify service calls that are to be made to populate requested web pages and to make updates to various databases.

The catalog service application 72 is generally responsible for providing the catalog content displayed throughout the various web pages of the site, as maintained in the item descriptions database 34 and possibly other databases. The blurbs service application 74 is generally responsible for handling blurb submissions and votes, responding to requests from the web server 70 for blurb content, and notifying the user accounts service 76 of events that affect the profiles of specific users. The above-described functionality for personalizing the selection of blurbs may also be included in this service component 74. The users accounts service application 76 is generally responsible for responding to requests for user account information (including item selection histories, vote and reputation data, etc.), and for updating the profiles of users in response to certain types of events. A "user" may generally be an individual, or a group of individuals that share a common computer or account.

The various application components shown in FIG. 8 may, for example, run on general purpose computers that are interconnected on a local area network.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims

What is claimed is:

1. A system for selecting items to present to users, the system comprising:
   a computer system comprising one or more computing devices, said computer system programmed to implement:
      a plurality of item selectors, each of which uses a different respective personalized selection algorithm to select items to nominate for presentation to a target user, each item selector configured to output item nominations together with a relevance score for each nominated item; and
      an arbiter that receives the item nominations and associated relevance scores from the item selectors, normalizes the relevance scores for the nominated items, and uses at least the normalized relevance scores to select particular nominated items to present to the target user.

2. The system of claim 1, wherein the items include blurbs authored by users.

3. The system of claim 1, wherein the system is implemented as part of an electronic catalog system that hosts a browsable electronic catalog of items, and at least some of the item selectors use catalog-item selection histories of particular users to nominate items to present to such users.

4. The system of claim 1, wherein at least one of the item selectors uses different information about the target user than another one of said item selectors to select items to nominate.

5. The system of claim 1, wherein at least some of the item selectors use item-specific feedback from users to select the items to nominate.

6. The system of claim 1, wherein at least some of the item selectors use an item selection history of the target user to select particular items to nominate.

7. The system of claim 1, wherein the arbiter selects particular nominated items to present to the target user at least in part by comparing the normalized relevance scores.

8. The system of claim 1, wherein the arbiter, in determining whether to select a nominated item to present to the target user, takes into consideration whether more than one of the item selectors nominated said nominated item for the target user.

9. The system of claim 1, wherein the arbiter selects particular nominated items to present to the target user so as to ensure that the items presented to the target user are not dominated by the nominations of a single item selector.

10. The system of claim 1, wherein the arbiter selects particular nominated items to present to the target user so as to ensure that the target user is presented with items nominated by each of the item selectors.

11. The system of claim 1, wherein the arbiter uses feedback from target users on particular items to assess, on a user-specific basis, how well particular item selectors perform for particular target users.

12. The system of claim 1, wherein the arbiter is responsive to the target user consistently responding favorably to items nominated by a particular item selector by favoring nominations of the particular item selector for the target user.

13. The system of claim 1, further comprising a personal log component that creates a personalized log for each user containing items select by the arbiter for the respective user.

14. A computer-implemented method of selecting items to present to users, the method comprising:
   using a plurality of personalized selection algorithms to select items to nominate for presentation to a target user, each personalized selection algorithm outputting one or more item nominations for the target user together with an associated relevance score for each nominated item, said personalized selection algorithms using different respective selection criteria to select particular items to nominate; and
   receiving the item nominations and associated relevance scores from the personalized selection algorithms, normalizing the relevance scores, and using at least the normalized relevance scores to select particular items to present to the target user;
   wherein the method is performed in its entirely by one or more computers.

15. The method of claim 14, wherein the items include blurbs authored by users.

16. The method of claim 14, wherein the method is implemented in association with an electronic catalog system that hosts a browsable electronic catalog of items, and at least some of the personalized selection algorithms use information about catalog-item selections of particular users to nominate items to present to the users.

17. The method of claim 14, wherein the method comprises using personalized item selection algorithms that use different respective information about the target user to select items to nominate.

18. The method of claim 14, wherein at least some of the personalized selection algorithms use item-specific feedback from users to select the items to nominate.

19. The method of claim 14, wherein using at least the normalized relevance scores to select particular items to present comprises comparing the normalized relevance scores.

20. The method of claim 14, wherein the method comprises selecting from the nominated items so as to ensure that the items selected to present to the target user are not dominated by nominations of a particular personalized selection algorithm.

21. The method of claim 14, wherein the method comprises selecting from the nominated items so as to ensure that the target user is presented with items nominated by each of the item selectors.

22. The method of claim 14, wherein the method comprises using feedback from the target user on particular items selected to present to the target user to assess how well particular personalized selection algorithms perform for the target user.

23. The method of claim 14, wherein the method comprises responding to consistent favorable feedback from the target user on items nominated by a particular personalized selection algorithm by increasing a frequency with which items nominated by the particular personalized selection algorithm are presented to the target user.

24. The method of claim 14, further comprising inserting the items selected to present to the target user into a personal log of the target user.

25. Computer storage which stores executable code that embodies the method of claim 14.

26. Physical computer storage having stored thereon executable code that directs one or more computers to implement:
- a plurality of item selectors, each of which uses a different respective personalized selection algorithm to select items to nominate for presentation to a target user, each item selector configured to output item nominations together with a relevance score for each nominated item; and
- an arbiter that receives the item nominations and associated relevance scores from the item selectors, normalizes the relevance scores for the nominated items, and uses at least the normalized relevance scores to select particular nominated items to present to the target user.

27. The physical computer storage of claim 26, wherein the items include blurbs authored by users.

28. The physical computer storage of claim 26, wherein at least some of the item selectors use catalog-item selection histories of particular users to nominate items to present to such users.

29. The physical computer storage of claim 26, wherein at least one of the item selectors uses different information about the target user than another one of said item selectors to select items to nominate.

30. The physical computer storage of claim 26, wherein at least some of the item selectors use item-specific feedback from users to select the items to nominate.

31. The physical computer storage of claim 26, wherein at least some of the item selectors use an item selection history of the target user to select particular items to nominate.

32. The physical computer storage of claim 26, wherein the arbiter selects particular nominated items to present to the target user at least in part by comparing the normalized relevance scores.

33. The physical computer storage of claim 26, wherein the arbiter, in determining whether to select a nominated item to present to the target user, takes into consideration whether more than one of the item selectors nominated said nominated item for the target user.

34. The physical computer storage of claim 26, wherein the arbiter selects particular nominated items to present to the target user so as to ensure that the items presented to the target user are not dominated by the nominations of a single item selector.

35. The physical computer storage of claim 26, wherein the arbiter is configured to select particular nominated items to present to the target user such that the target user is presented with items nominated by each of the item selectors.

36. The physical computer storage of claim 26, wherein the arbiter uses feedback from target users on particular items to assess, on a user-specific basis, how well particular item selectors perform for particular target users.

37. The physical computer storage of claim 26, wherein the arbiter is responsive to the target user consistently responding favorably to items nominated by a particular item selector by favoring nominations of the particular item selector for the target user.

38. The physical computer storage of claim 26, wherein the executable code further directs the one or more computers to implement a personal log component that creates a personalized log for each user containing items select by the arbiter for the respective user.

39. The system of claim 1, wherein the computer system comprises a plurality of computers.

* * * * *